United States Patent [19]

Matsumoto et al.

[11] Patent Number: 4,667,245

[45] Date of Patent: May 19, 1987

[54] IMAGE INFORMATION DETECTING APPARATUS

[75] Inventors: Fumio Matsumoto, Tokyo; Kenji Nakauchi; Atsushi Shiraishi, both of Kaisei, all of Japan

[73] Assignee: Fuji Photo Film Co., Ltd., Kanagawa, Japan

[21] Appl. No.: 691,109

[22] Filed: Jan. 14, 1985

[30] Foreign Application Priority Data

Jan. 24, 1984 [JP] Japan .................................. 59-10531

[51] Int. Cl.$^4$ ...................... G03B 27/72; H04N 5/253
[52] U.S. Cl. ................................... 358/214; 358/215; 358/213.13; 358/213.19
[58] Field of Search ............... 358/214, 215, 216, 225, 358/209, 213, 212, 54

[56] References Cited

U.S. PATENT DOCUMENTS 3,225,140 12/1965 Ferber et al. ......................... 358/225
3,988,602 10/1976 Gorsica, Jr. ........................... 358/214
4,485,406 11/1984 Brownstein .......................... 358/214

FOREIGN PATENT DOCUMENTS

52-48432 4/1977 Japan ...................................... 358/54

*Primary Examiner*—Gene Z. Rubinson
*Assistant Examiner*—Stephen Brinich
*Attorney, Agent, or Firm*—Wenderoth, Lind & Ponack

[57] ABSTRACT

An image information detector of a photographic printer comprises a two-dimensional image sensor at a line sensor disposed near a film negative placed on a film carrier to receive and sense a light from a light source which has been transmitted through or reflected from the film negative. The entire image of the film negative is divided into a plurality of equally aligned picture elements by the two-dimensional image sensor or line sensor, which is driven by a driving circuit. Signals regarding image information of the divided picture elements in analog form are processed by a circuit provided with a signal processing unit and a signal memory.

4 Claims, 11 Drawing Figures

FIG. 4A FILM NEGATIVE

IMAGE INFORMATION DETECTING APPARATUS

BACKGROUND OF THE INVENTION

This invention relates to an apparatus for detecting photographic image information of an original photographic film such as a film negative in a photographic printer by entirely dividing image information into a plurality of aligned picture elements to be detected.

With a photographic printer, it is generally required to measure a density of an original film, for example a film negative, for detecting the printing exposure amount or correction amount, and in the prior art of this field, the large area transmittance density (LATD) of the film negative is measured by photo-sensitive sensors such as photodiodes disposed near a light passage of a printing lens unit. However, in the image detection method by means of this LATD, the average density of the image of the film negative is measured and detected by the photo-sensitive sensors and the image density is not accurately detected entirely throughout the image surface, so that the printing exposure or correction cannot be correctly performed. In the prior art, there has also been proposed a method in which the image surface of the film negative is divided into a plurality of equally aligned picture segments, and the light passing the segments is measured, and the densities detected in accordance with the measured light are corrected after the printing exposure amount was determined. However, with this method, since the light measurement of the film negative is only carried out approximately, it is difficult to accurately detect information regarding detail of the image of the film negative.

SUMMARY OF THE INVENTION

An object of this invention is to eliminate defects of the prior art technique and to provide an apparatus for accurately detecting image information of a photograph which has relatively simple construction for accurately and in detail detecting the information regarding the image of an original film such as a film negative.

According to this invention, for achieving this and the other objects, there is provided an image information detecting apparatus of a photographic printer of the type comprising a carrier on which an original film is mounted and a light source for irradiating the original film, and is characterized in that a two-dimensional image sensor is disposed near the original film carrier for receiving and sensing a transmitted light from the light source which has passed through the original film; a driving circuit is connected to the two-dimensional image sensor for driving the sensor, and a circuit is operatively connected to the two-dimensional image sensor for processing and storing signals regarding the image of the original film and output from the two-dimensional image sensor.

According to the image information detecting apparatus of this invention, an original film such as film negative can be divided into a plurality of aligned picture elements and the image information with respect to the divided picture elements can be accuately detected and stored, respectively.

The nature, principle and utility of the invention will become more apparent from the following detailed description when read in conjunction with the accompanying drawings.

DESCRIPTION OF THE PREFERRED EMBODIMETS

Figure 1:
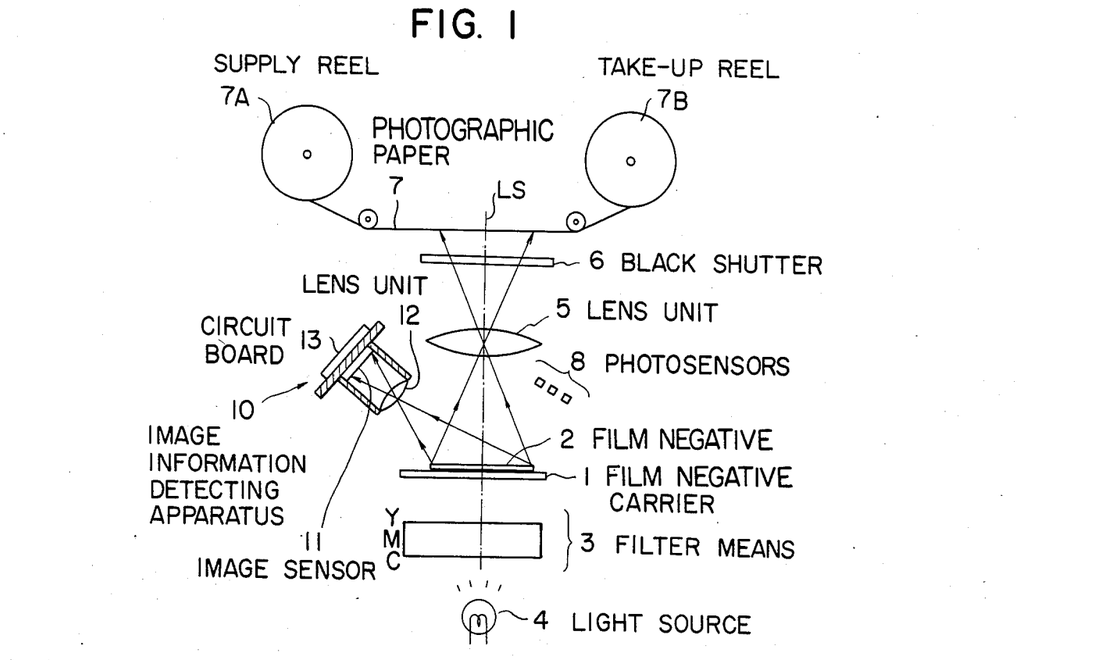
FIG. 1 is a schematic constructional view of a photographic printer including a photographic image information detecting apparatus according to this invention.

FIG. 1 shows one example of a photographic printer to which a photographic image information detecting apparatus 10 of this invention is applied. A film negative 2, mounted on a film negative carrier 1 and conveyed to a printing portion, is irradiated by a light source 4 whose light output passes through a filter means 3 consisting of three primary color filters regarding yellow (Y), magenta (M) and cyan (C) colors. A light passing the negative film 2 is projected on a photographic paper 7 through a lens unit 5 and a black shutter 6. The photographic paper 7 is wound around a supply reel 7A and wound up around a fake-up reel 7B which is operated in synchronism with the conveyance and stoppage of the film negative 2 on the film negative carrier 1. Photosensors 8 such as photodiodes for detecting information regarding image densities of the three primary colors of red (R), green (G) and blue (B) are located near the lens unit 5 between the lens 5 and the film negative carrier 1 and a printing operation is carried out by the LATD detected by the photosensors 8. A two-dimensional image sensor 11 generally comprising a plurality of elements is arranged near the negative film 2 in an inclined manner with respect to the light axis LS between the light source 4 and the film negative 2 on the film negative carrier 1. A lens unit 12 is located at a portion in front of the two-dimensionsl image sensor 11 for focusing the image of the central portion of the film negative 2. The two-dimensional image sensor 11 and the lens unit 12 are assembled in one unit as an image information detecting apparatuss 10 on the rear surface of which is mounted a circuit board 13 to which a processing circuit such as integrated circuits and so on for processing the image are attached.

Figure 2:
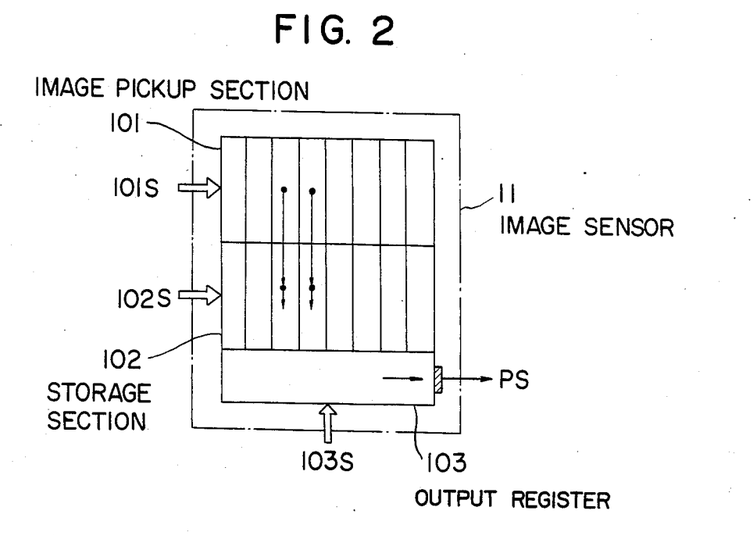
FIG. 2 is a schematic constructional view of a two-dimensional image sensor used for the photographic image information detecting apparatus of this invention.
Figure 3:
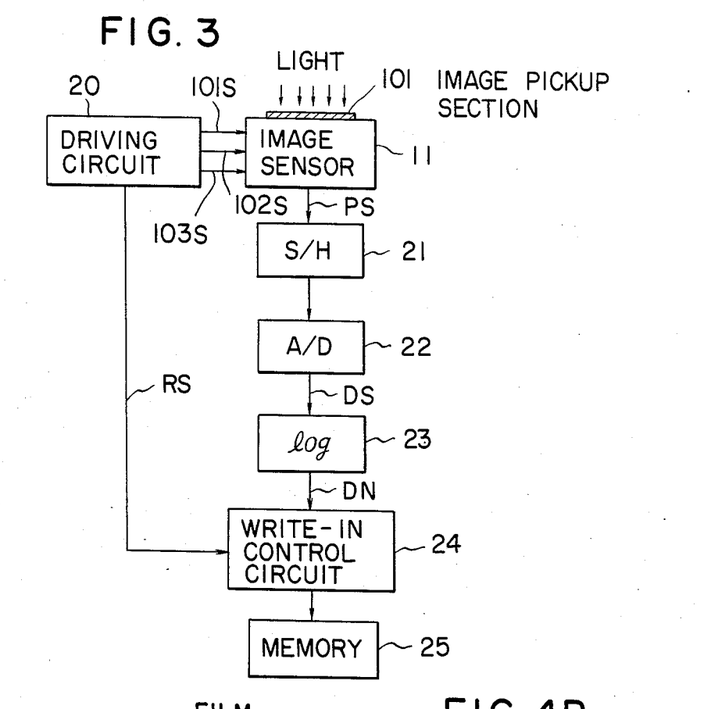
FIG. 3 is a block diagram showing a controlling system for the two-dimensional image sensor.

The two-dimensional image sensor 11 is briefly shown in FIG. 2 and comprises an image pickup section 101 for optically picking up an image of a film negative 2, a storage section 102 for storing electrical charges transferred from the image pickup section 101 and an output register 103 for outputting the electrical charges stored in the storage section 102. According to this construction, the two-dimensional image sensor 11 operates so that drive signals 101S to 103S from a driving circuit are used to control the sensor 11 so as to photoelectrically convert the image information regarding the two-dimensional area and to generate a serial picture signal PS in analog form from the output register 103. The circuit means mounted on the circuit board 13 is composed of, for example, as shown in FIG. 3, a circuit in which the image sensor 11 is operatively connected to the driving circuit 20 and is operated by the drive signals 101S to 103S from the driving circuit 20. The light impinging upon the image pickup section 101 of the image sensor 11 is outputted from the output register 103 as a picture signal PS, which is then sampled by a sample-and-hold circuit 21 and held therein, and the sampled signal is then converted into digital signals DS by an A/D (analog-to-digital) converter 22. The digital signals DS from the A/D converter 22 are inputted into a logarithmic conversion circuit 23 to logarithmically convert the digital signals DS into the density signals DN representing the density of the image of the negative film 2 and the density signals DN are then written in a memory 25 through a write-in control circuit 24. In the write-in control circuit 24, a signal RS representing the read-out speed for reading out at a constant speed the image information obtained by the image sensor 11 operated by the driving circuit 20 is preliminarily inputted and the density signals DN are written in predetermined addresses of the memory 25 in response to the driving speed of the image sensor 11.

In case of the usual photographic printing operation, according to the construction of the circuit means shown in FIG. 3, the light transmitted through the film negative 2 mounted on the film negative carrier 1 is detected by the photosensors 8 and then exposed on the photographic paper 7 with the exposure amount to be determined by the opening degree of the black shutter 6 based on the arrangement of the filter means 3 in response to the image signals regarding the three primary colors R, G and B, respectively. Note that the these filters of the filter means 3 are all shown symbolically in the drawing figures as three fixed filters which are always in the light path. It is, of course, understood that the transmittance of these filters, which are of a band-pass type, are individually adjustable by the usual prior art method known to those skilled in the art.

Figure 4A:
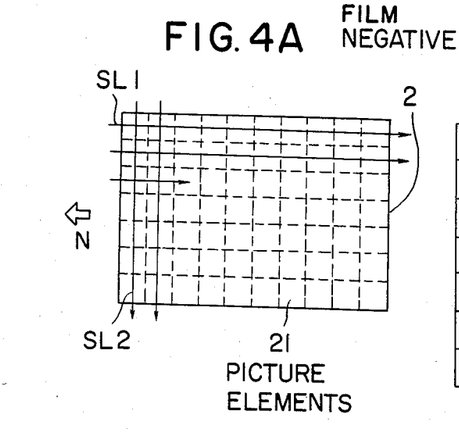
FIGS. 4A and 4B are views for showing the correspondence between the picture elements of the original film and the stored data according to the principle of this invention.
Figure 4B:
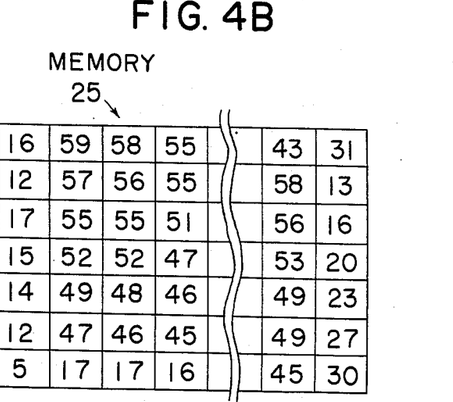

According to this invention, the image information detecting apparatus 10 is arranged near the film negative 2 mounted on the film negative carrier 1 to detect the image information regarding a plurality of equally divided and aligned picture elements of the photographic image throughout the whole film negative surface. In other wards, since the two-dimensional image sensor 11 receives the light transmitted through the negative film 2 on the film negative carrier 1 through the lens unit 12 in accordance with the predetermined drive signals 101S to 103S from the drive circuit 20, the two-dimensional image sensor 11 divides the image of the film negative 2 into a plurality of aligned picture elements 21 as shown in FIG. 4A and scans sequentially the whole image of the film negative 2 in accordance with scanning lines SL1. After the completion of the scanning operation, the picture signal PS is subsequently transmitted from the output register 103 of the image sensor 11 and sampled and held by the sample-and-hold circuit 21. The sampled signals are then converted into the digital signals DS by the A/D converter 22. The digital signals DS from the A/D converter 22 are logarithmically converted into the density signals DN, which are then controlled by the write-in control circuit 24 and stored in the memory 25 in the aligned order corresponding to the picture elements 21 as digital signals regarding the density of the film negative 2 as shown in FIG. 4B. During the operation described above, it becomes possible to always correspond the divided element position of the image of the negative film 2 to the data arrangment to be stored in the memory 25 by controlling the timing for writing the read-out speed signal RS received from the driving circuit 20 into the memory 25.

As described hereinabve, the digital values corresponding to the divided picture elements 21 of the picture image of the film negative 2 can be optionally read out from the memory 25 by storing therein the digital values of the picture elements of the film negative 2 or the density values of the picture elements regarding the three primary colors. Accordingly, if the density values regarding the three primary colors R, G and B are preliminarily stored as shown in FIG. 4B, the stored values can be read out and processed for example by operating or calculating the values, whereby the processed data can be utilized for determining the exposure amount or correction amount for the photograph printing operation as performed by the prior art method. In addition, since the two-dimensional image sensor 11 can detect the image information of the divided picture elements of the whole image of the film negative 2, the image information can be entirely accurately detected. Since the image sensor 11 is composed of a predetermined number of picture elements, the image can be physically divided in accordance with the number of the picture elements, the number of elements of the image to be divided can be changed in accordance with the read-out speed change in a case where the film negative 2 and the image sensor 11 are moved relative to each other.

Figure 5:
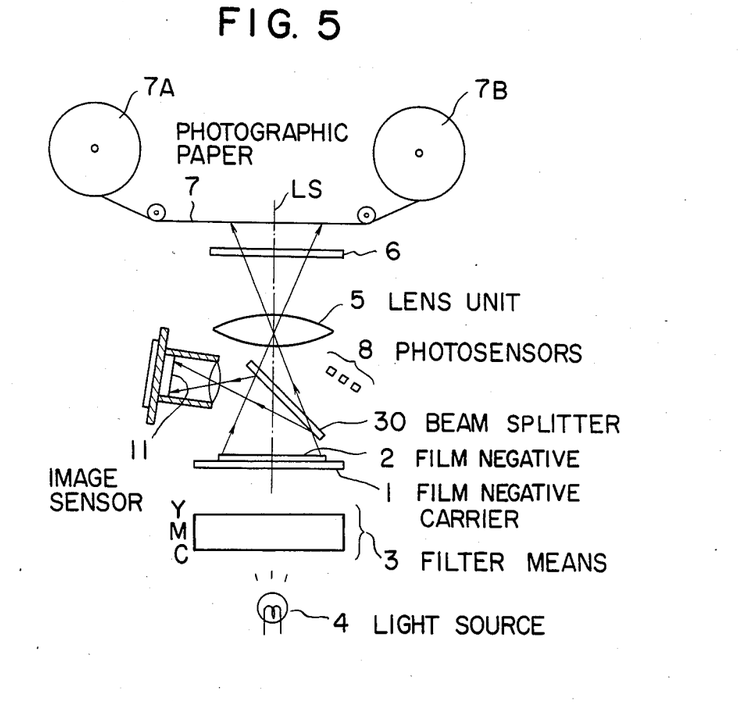
FIGS. 5 through 7 are schematic constructional views of a photographic printer including the other embodiments of the image information detecting apparatus of this invention, respectively.

Although, in the foregoing embodiment, the two-dimensional image sensor 11 is located so as to be inclined with respect to the light axis LS between the film negative 2 on the film negative carrier 1 and the light source 4, the light transmitted through the film negative 2 can be projected on the image sensor 11 through a beam splitter 30 disposed between the negative film 2 and the lens unit 5 by reflecting the light by the beam splitter 30 as shown in FIG. 5. In the embodiment represented by FIG. 5, the light passing the beam splitter 30 can be irradiated on the photographic paper 7 through the lens unit 5.

Figures 6, 7:
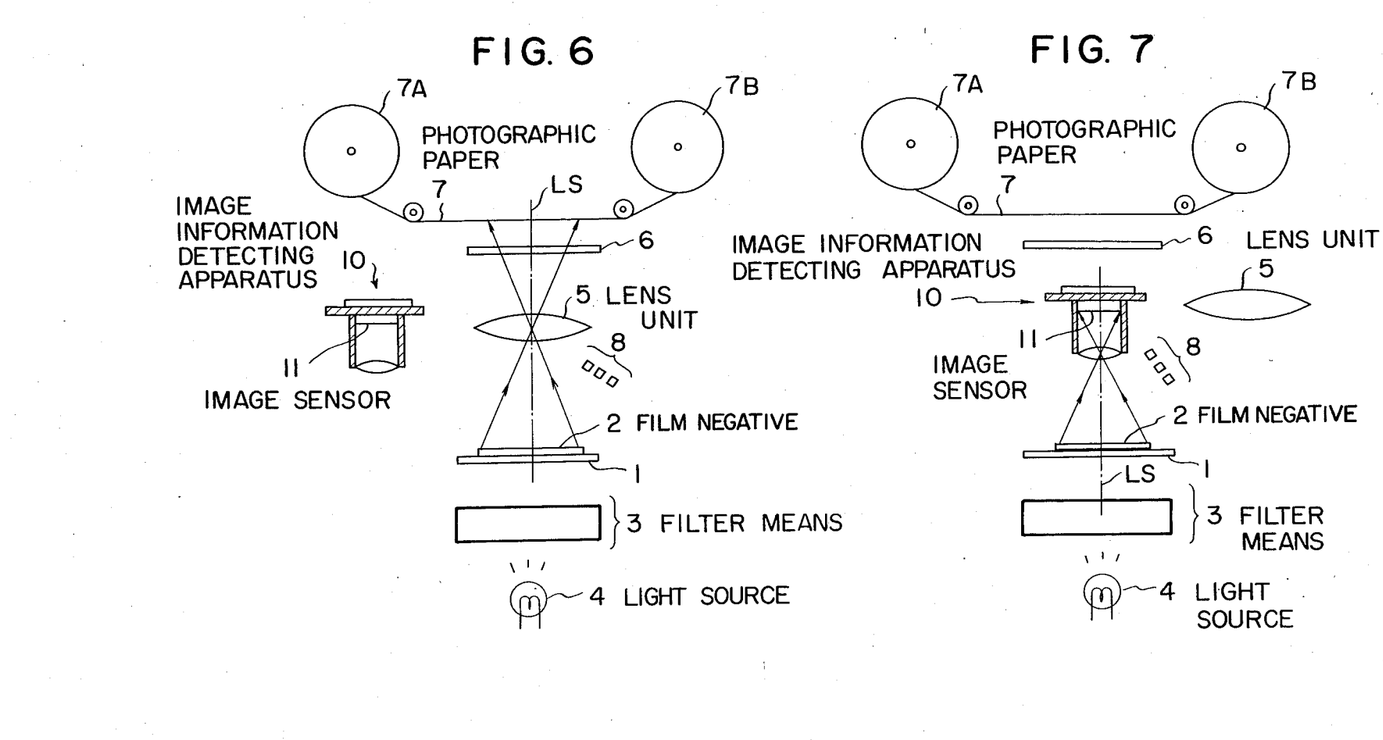

FIGS. 6 and 7 also represent the other embodiment of this invention, in which the lens unit 5 and the image information detecting apparatus 10 are respectively arranged so as to be movable with respect to the light axis LS. When it is necessary to print the image of the film negative 2 on the photographic paper 7, the lens unit 5 may be aligned with the light axis LS as shown in FIG. 6 and when it is necessary to detect the information of the image the film negative 2, the image information detecting apparatus 10 may be aligned with the light axis LS as shown in FIG. 7. According to the embodiments described above, the information regarding the image of the photograph can be entirely detected by the image information detecting apparatus 10.

Although, in the respective embodiments described hereinbefore, the image information of the film negative 2 can be detected by the light passing through the film negative 2 using the two-dimensional image sensor 11, it is possible to detect the information of the whole image of the film negative 2 by applying the light reflected from the film negative 2 to the two-dimensional image sensor 11. Moreover, according to this invention, when the photograph is printed by arranging a rotatable mirror on the light axis passing the light source and the film negative, the mirror is removed from the position on the light axis to thereby print the image of the film negative on the photographic paper, and on the other hand, when the information of the image of the film negative is detected, the mirror is rotated on the light axis to thereby direct light through the film negative to the two-dimensional image sensor.

Furtheremore, the number of elements of the image sensor can be optionally selected in accordance with the size of the original film such as a film negative, the magnification of the lens unit, and the necessary number of the picture elements of the image.

Needless to say, the above described detection is applicable to storage-type light receiving elements of a line sensor. The detection with a line sensor is described below.

Figure 8:
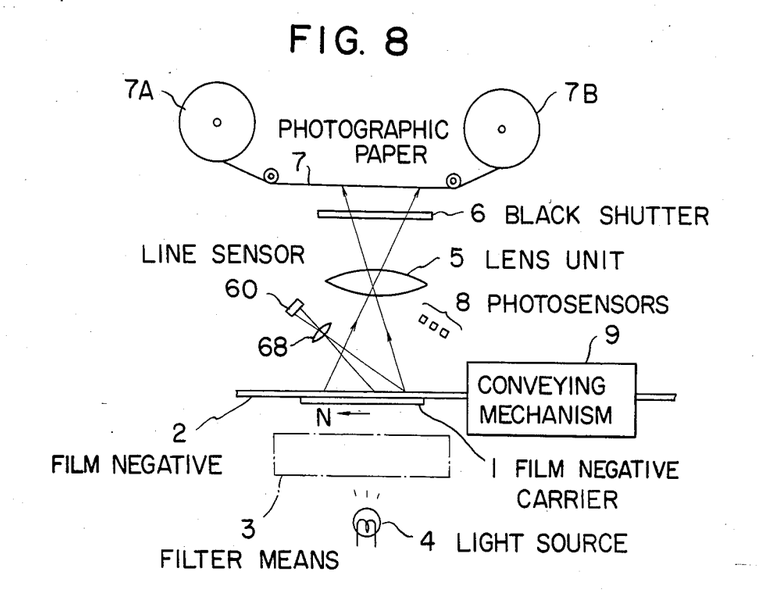
FIG. 8 is a structural view to show another embodiment of this invention.
Figure 9:
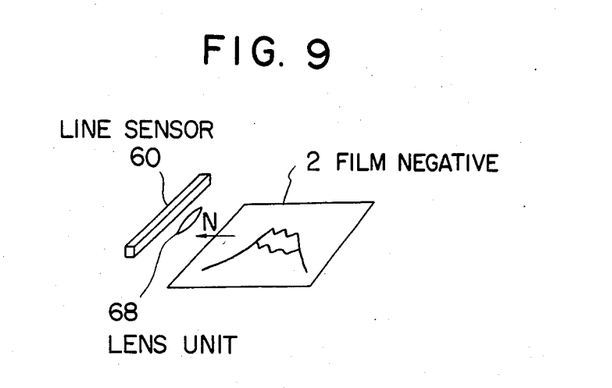
FIG. 9 is a view to explain the positional relation between the line sensor and a film negative.

FIG. 8 shows an embodiment of a photographic printer using a line sensor 60. A film negative 2 which is placed on a film negative carrier 1 is conveyed, for instance, in the direction N by the conveying mechanism 9. While being conveyed, a line sensor 60 detects the image information of the film negative 2 via a lens unit 68. Except for this feature, the embodiment is identical to the one shown in FIG. 1. The positional relationship between the line sensor 60 and the movement of the film 2 is shown in FIG. 9. The line sensor 60 is arranged at a position perpendicular to the conveying direction N of the film negative 2 and in parallel to the surface thereof. The scanning of a frame is determined by the relationship between the scanning line SL2 and the conveying direction N of the film negative 2 shown in FIG. 4A and the image information of one frame can therefore be output as one frame of the film negative as it is conveyed.

Figure 10:
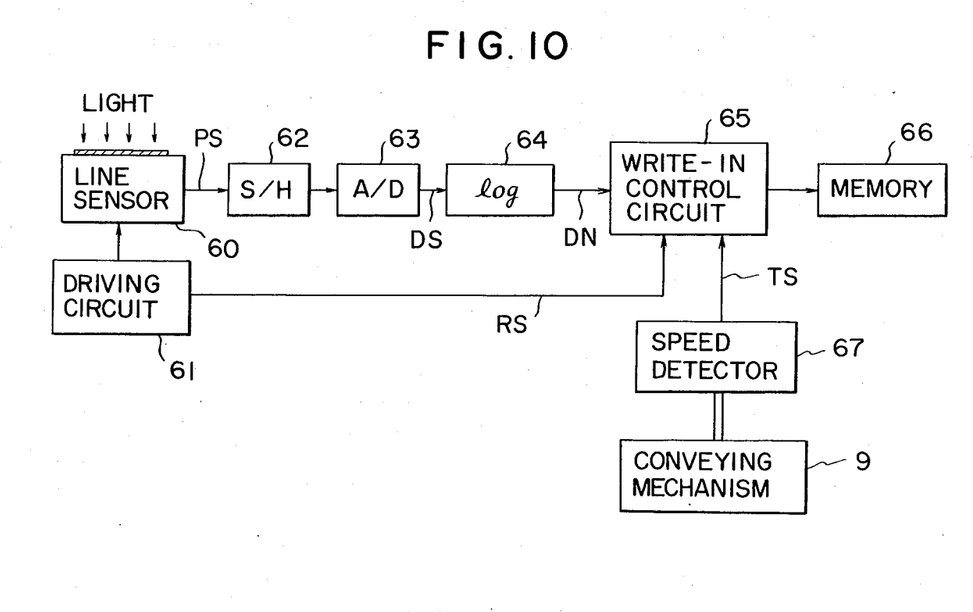
FIG. 10 is a block diagram to show the control system thereof.

FIG. 10 is a block diagram to show the control system of a line sensor 60. The line sensor 60 is driven by a driving circuit 61, and the picture signals PS read out and photoelectrically converted by the line sensor 60 are inputted into a sample-and-hold circuit 62 and sampled at a predeterined speed. The sampled value is converted into digital signals DS by an A/D converter 63. The digital signals DS from the A/D converter 63 are inputted into a logarithmic converter 64, and converted into density signals DN and then written in a memory 68 via write-in control circuit 65. In this case, the write-in control circuit 65 receives a reading-out speed signal RS outputted in correspondence with the driving speed of the driving circuit 61 and a speed signal TS from a speed detector 67 connected to a conveying mechanism 9 which conveys the film negative 2. The write-in control circuit reads the picture image information for each line in correspondence with the reading speed of the line sensor 60 and the conveying speed of the film negative 2, whereby the memory 66 can store density value data for each of the segmented elements which are arranged in plural arrays similar to the one shown in FIG. 4B.

When the image information of a film negative 2 is detected by a line sensor 60 with the aforementioned structure, the film negative 2 is carried by a conveying mechanism 9 in the direction N with a predetermined speed. The conveying speed is detected by a speed detector 67 and the speed signal TS is inputted into a write-in control circuit 65. When the film negative 2 is carried in the direction N, the light which is transmitted through the film negative 2 is inputted into the line sensor 60. The line sensor 60 is then driven by a driving circuit 61 with a driving signal to output a picture signal PS which is photoelectrically converted in accordance with the amount of light received. Since the reading speed of the line sensor 60 corresponds with the pulse frequency of the driving signal from the driving circuit 61, if the line sensor 60 is driven at a speed relatively higher than the conveying speed of the negative film 2, then the film negative 2 can consecutively be segmented into plural and arrayed picture elements 21 by scanning line SL2 which is perpendicular to the direction N as shown in FIG. 4A. The picture signals PS from the line sensor 60 for each of the scanning lines SL2 are inputted into the sample-and-hold circuit 62 and the sampled values are converted into digital signals DS by the A/D converter 63. The digital signals DS are converted into density signals DN by the logarithmic converter 64 and written in the memory 66 via a write-in control circuit 65. Since the reading speed signal RS is inputted into the wirte-in control ciruit 65 from the driving circuit 61 to determine the relationship between the reading out and the writing-in, the density signals DN from the logarithmic converter 64 consequently causes the density data to be written-in at the position corresponding to the segmentation of the film negative 2 as shown in FIG. 4B. By repeating the detection of the picture image information for each scanning line SL2 by the line sensor 60 and the writing-in of the density data in the memory 66 over the whole surface of the film negative 2, the density signals DN are stored in the memory 66 in the arrays corresponding to the segmented picture elements 21 of the picture frame.

Although the line sensor 60 is fixed and the film negative 2 is conveyed at a predetermined speed to the line sensor 60 for detecting the image information over the whole surface of the film in the above embodiment, it is possible to have the film negative 2 fixed and the line sensor 60 move across the whole surface of the film negative 2 to achieve the same effect.

As described hereinabove, according to the photographic image information detecting apparatus of this invention, an image of an original film such as a film negative is entirely divided into a plurality of aligned picture elements and the image information of the respective picture elements can be accurately detected and stored in a memory, so as that the accurate and detailed image information of a photograph can by obtained. Moreover, be obtaining image information of the original film with respect to the respective colors red(R), green(G) and blue(B), it will be possible to accurately determine an exposure amount or correction amount for a photograph printing in accordance with the detected image information.

It should be understood that many modifications and adaptations of the invention will become more apparent to those skilled in the art and it is intended to encompass such obvious modifications and changes in the scope of the claims appended hereto.

What is claimed is:

1. An image information detecting apparatus of a photographic printer of the type comprising a film carrier on which a stationary original film is mounted, a light source for irradiating the stationary original film and for being used for photographic printing, and a printing section provided with a photographic paper on which an image of the original film is exposed, said printing section having a light axis disposed between said light source and the photographic paper, comprising:

- a two-dimensional image sensor arranged near the original film which is positioned at the printing section and is inclined with respect to said light axis for receiving and sensing transmitting light or reflected light from said light source which has respectively passed through or been reflected from the original film on said film carrier;
- a driving circuit connected to said two-dimensional image sensor for driving said sensor; and
- a circuit means operatively connected to said two-dimensional image sensor for processing and storing data regarding the image of the original film from said two-dimensional image sensor.

2. An image information detecting apparatus according to claim 1, wherein said two-dimensional image sensor comprises: an image pickup section for optically picking up the image of the original film; a storage section for storing electrical charges from said image pickup section; and an output register for outputting the electrical charges stored in said in said storage section; and wherein an entire image of the original image is divided into a plurality of aligned picture elements by said two-dimensional image sensor and a series of picture signals in an analog form is outputted from said output register of the two-dimensional image sensor.

3. An image information detecting apparatus according to claim 1, wherein a beam splitter is further disposed at a portion between said original film on said film carrier and said printer to reflect the light transmitted through said original film to said two-dimensional image sensor.

4. An image information detecting apparatus according to claim 1, wherein said circuit means for processing and storing picture signals from said two-dimensional image sensor comprises: a sample-and-hold circuit for sampling with a predetermined sampling period of said picture signals from said two-dimensional image sensor and holding the sample; an analog-to-digital converter for converting said picture signals from said sample-and-hold circuit from an analog form into digital signals; a logarithmic conversion circuit for converting said digital signals from said analog-to-digital converter into logarithmically converted signals representing density of the picture elements of the original film and used as density signals, and a memory means for storing said density signals.

* * * * *